United States Patent [19]
Sheldon

[11] Patent Number: 5,887,356
[45] Date of Patent: Mar. 30, 1999

[54] MULTI-AXIS CONTINUOUS PROBE

[75] Inventor: Paul C. Sheldon, Mequon, Wis.

[73] Assignee: Sheldon/Van Someren, Inc., Cypress, Tex.

[21] Appl. No.: 707,128

[22] Filed: Sep. 3, 1996

[51] Int. Cl.⁶ .................. G01B 5/20; G01B 7/28
[52] U.S. Cl. .................. 33/556; 33/559
[58] Field of Search .................. 33/559, 556, 1 M, 33/503, 558, 561; 73/866.5; 483/1; 409/201, 132, 235; 403/157; 74/479.01

[56] References Cited

U.S. PATENT DOCUMENTS

| | | | |
|---|---|---|---|
| 3,869,799 | 3/1975 | Neuer et al. | |
| 4,078,314 | 3/1978 | McMurtry | |
| 4,716,656 | 1/1988 | Maddock et al. | 33/503 |
| 4,769,763 | 9/1988 | Trieb et al. | 33/503 |
| 4,879,916 | 11/1989 | Juillerat | 33/561 |
| 5,083,379 | 1/1992 | Enderle et al. | 33/556 |
| 5,088,208 | 2/1992 | Wells et al. | 33/559 |
| 5,109,610 | 5/1992 | Johnson | 33/503 |
| 5,390,424 | 2/1995 | Butter et al. | 33/561 |
| 5,396,714 | 3/1995 | Sturges, Jr. et al. | 33/520 |
| 5,489,168 | 2/1996 | Sheldon et al. | 409/235 |
| 5,505,005 | 4/1996 | McMurtry et al. | |

*Primary Examiner*—Christopher W. Fulton
*Attorney, Agent, or Firm*—Robert A. Van Someren

[57] ABSTRACT

A touch probe includes a base structure and a stylus supporting member. The base structure and stylus supporting member are connected by six extensible legs that permit the stylus supporting member to move with six degrees of freedom relative to the base structure. A plurality of sensors are arranged to measure movement of the stylus supporting member relative to the base structure along all six axes.

20 Claims, 3 Drawing Sheets

MULTI-AXIS CONTINUOUS PROBE

FIELD OF THE INVENTION

The present invention relates generally to a continuous probe of the type used on a coordinate positioning machine, and particularly to a probe able to sense movement of a stylus along multiple axes.

BACKGROUND OF THE INVENTION

A variety of touch probes are used with coordinate positioning machines, such as coordinate measuring machines or machine tools to measure a position on or along a surface, e.g., a workpiece surface. There are many coordinate positioning machine designs, but such machines typically include a moveable arm to which the probe is attached. The arm is supported for movement relative to a datum, such as a platform or table on which a workpiece is supported. This allows an operator to use the coordinate positioning machine in combination with the probe to determine whether certain positions on the workpiece are at their proper location relative to the structure on which the workpiece is supported.

Some probes, such as touch probes, are designed to produce a signal when the stylus carried by the probe contacts a surface. This type of probe includes a fixed structure that is mounted to the moveable arm of the coordinate positioning machine. A stylus structure is supported on the fixed structure at several locations. For example, the stylus structure may include three balls biased against a contact surface of the fixed structure. In some designs, the balls and contact surfaces are part of a circuit which is broken when the stylus contacts an object and one of the balls is forced away from the contact surface. When the circuit is broken, a signal is provided to indicate the contact between the stylus and an object. In other probes, the stylus support structure is connected to a strain sensor that provides a signal when strain is induced via contact of the stylus with an object.

With these types of probes, it is critical that the stylus be moved back to a precise and repeatable rest position after contact with an object. Sometimes grooves may be formed in the contact surface to assist in precisely reseating the balls after deflection of the stylus. Without this precise reseating of the stylus support structure, the position of the stylus would be different for each subsequent measurement of position, and errors would be introduced into the measurement.

The accuracy of these probes depends on maintaining a mechanically repeatable rest position of the stylus support structure This is often difficult, because wear can result due to the repeated contact between the balls and the contact surface and due to the electrical current that can degrade electrical contacts. Also, slow, careful contact is necessary to obtain an accurate measurement of the point at which the stylus contacted the object. In fact, the required sensitivity may be so great it is sometimes necessary to adjust the amount of force biasing the stylus support structure back to its rest position when different styli are interchanged.

Attempts have been made to design probes able to measure movement of the stylus after contact with an object. If this movement can be measured, then it is a straightforward mathematical calculation to determine the location of the stylus prior to movement and thus the precise point of contact with the object being measured, obviating the need for a precise mechanically repeatable rest position. For example, in U.S. Pat. No. 5,390,424, an analog probe is disclosed that measures the movement of a stylus along the three linear axes commonly known as the x-axis, y-axis and z-axis. This probe includes a stylus-supporting assembly that has three slideable members supported on air bearings for movement along the x, y and z axes. The movement in the x, y or z directions is measured by opto-electronic transducers that each comprise a scale and a readhead. Thus, movement of the stylus after contacting the object being measured can be sensed in three linear directions.

The probe described above works well in many applications, but movement of the stylus supporting member must be accurately constrained to movement along the three linear axes. Any other movement of the stylus would be detrimental to the accuracy of the probe. However, a stylus, like any object, potentially can be moved with six degrees of freedom. The stylus can be moved along the linear axes x, y and z, but it can also be moved along the rotational axes, commonly known as the a-axis, b-axis, and c-axis. The a, b and c axes represent rotational movement of an object about the x, y and z axes respectively.

Therefore, it would be advantageous to avoid these limitations and to provide a multi-axis continuous probe potentially able to track the movement of its stylus along all six axes.

SUMMARY OF THE INVENTION

A preferred embodiment of the present invention features a continuous probe for use in a coordinate positioning machine having a moveable arm. The probe comprises a base structure by which the probe may be mounted to the moveable arm. A stylus supporting member is connected to the base structure by a linkage assembly. A plurality of sensors are arranged to measure movement of the stylus supporting member relative to the base structure along three linear axes and three rotational axes.

According to another aspect of the invention, a probe is provided for use on a coordinate positioning machine having a moveable arm. The probe comprises a base structure for mounting to the moveable arm and a stylus supporting member. A plurality of legs connect the base structure and the stylus supporting member. Each leg includes a first end pivotably connected to the base structure and a second end pivotably connected to the stylus supporting member. The second end of each leg is moved towards or away from the first end depending on the movement of the stylus supporting member with respect to the base structure. The legs can be, for instance, telescopic legs or hinged legs. Additionally, a plurality of sensors are arranged to measure movement of the stylus supporting member relative to the base structure along a plurality of axes. This obviates the need for a mechanically repeatable rest position, and it allows the probe to be dragged along a surface contour to scan that contour.

According to a similar aspect of the invention, a method is provided for preparing a multi-axis probe that can be used on a coordinate positioning machine having a moveable arm. The method includes the steps of preparing a base structure that is mountable to the moveable arm and preparing a stylus supporting member. The method further includes the step of connecting the stylus supporting member to the base structure by a plurality of adjustable legs. Each adjustable leg is pivotably connected to both the base structure and the stylus supporting member. Further, the method includes the step of biasing the stylus supporting member in a direction away from the base structure.

BRIEF DESCRIPTION OF THE DRAWINGS

The invention will hereafter be described with reference to the accompanying drawings, wherein like reference numerals denote like elements, and.

DETAILED DESCRIPTION OF THE PREFERRED EMBODIMENT

Figure 1:
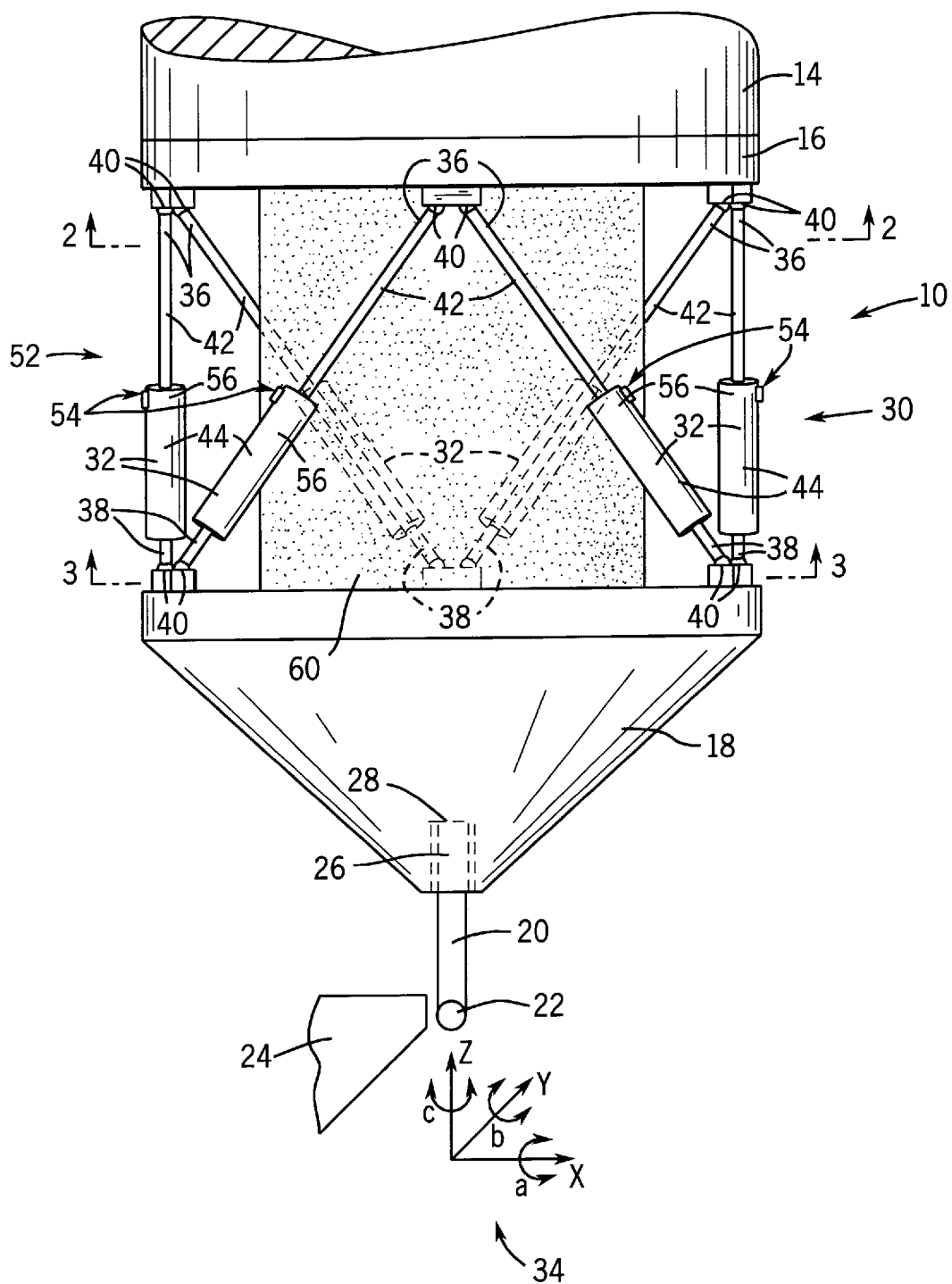
FIG. 1 is a front view of a touch probe according to a preferred embodiment of the present invention.
Figure 2:
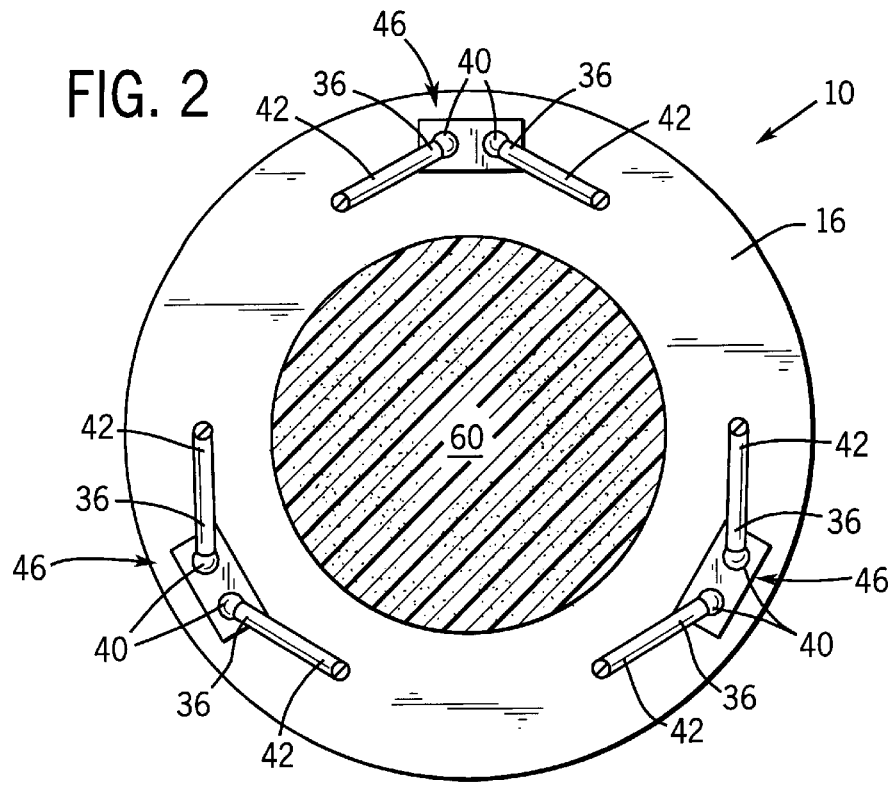
FIG. 2 is a cross sectional view of the touch probe taken generally along line 2—2 of FIG. 1.
Figure 3:
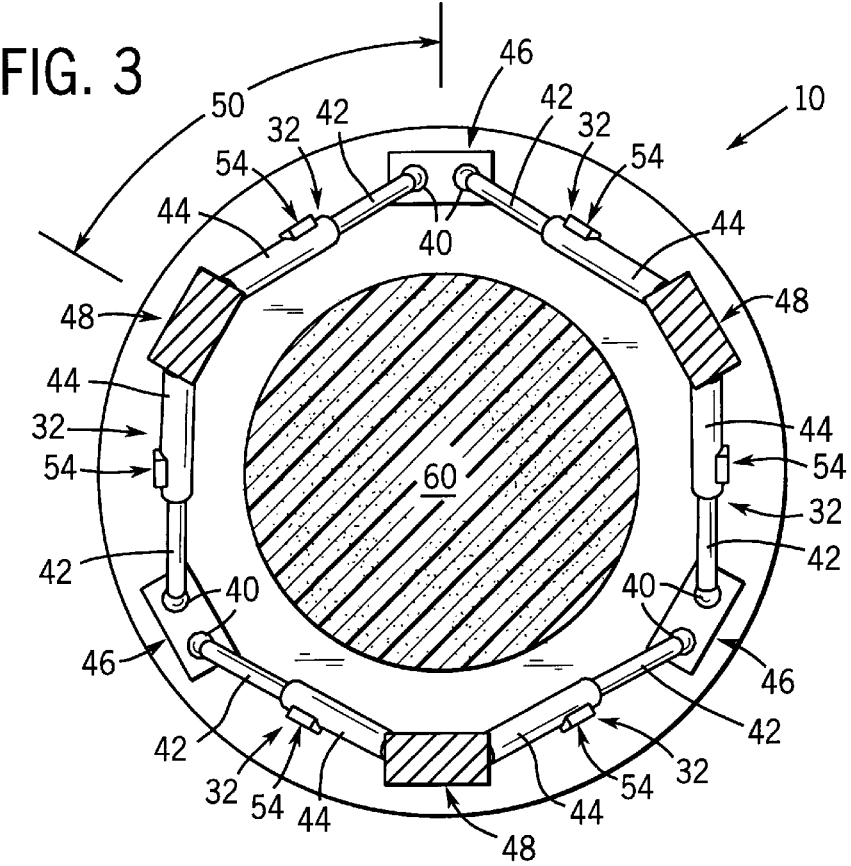
FIG. 3 is a cross sectional view of the touch probe taken generally along line 3—3 of FIG. 1.

Referring generally to FIGS. 1—3, a continuous probe 10 is illustrated. Continuous probe 10 can be used in a variety of coordinate positioning machines, such as coordinate measurement machines or machine tools. Typically, such machines include a moveable arm 14 to which probe 10 can be attached in a conventional manner.

Continuous probe 10 includes a base structure 16 that can be mounted to moveable arm 14. Preferably base structure 16 is configured for removable mounting to moveable arm 14 by any of a variety of ways as known to those of ordinary skill in the art. Touch probe 10 also includes a stylus supporting member 18 designed to securely hold a stylus 20. Stylus 20 includes a sensing tip 22 that can be moved into contact with a workpiece 24. Preferably stylus 20 is replaceable and removeably attached to stylus supporting member 18 by, for instance, a threaded portion 26 received in a threaded bore 28 of stylus supporting member 18.

Stylus supporting member 18 is connected to base structure 16 by a linkage assembly 30. Linkage assembly 30 permits stylus supporting member 18 to move with respect to base structure 16. In the illustrated embodiment, linkage assembly 30 includes a plurality of legs 32, preferably six legs, that permit stylus supporting member 18 to move with six degrees of freedom relative to base structure 16. The six degrees of freedom can be defined by the three linear axes x, y, z and the three rotational axes a, b, c, as illustrated by a diagram 34 in FIG. 1.

Each leg 32 includes a first end 36 pivotably mounted to the base structure 16 and a second end 38 pivotably mounted to stylus supporting member 18. First ends 36 and second ends 38 can be pivotably mounted to the base structure 16 and the stylus supporting member 18, respectively, by pivot mounts 40, such as ball and socket mounts 40. Each leg 32 is designed to permit its first end 36 to move towards or away from its second end 38 as stylus supporting member 18 is moved with respect to base structure 16. To accommodate this movement, each leg 32 includes a first component 42 slideably engaged with a second component 44. For example, second component 44 could be a cylinder having an opening therethrough and first component 44 could be a rod slideably received in the opening for telescopic extension and retraction.

Legs 32 can be connected between base structure 16 and stylus supporting member 18 in several different orientations. However, a preferred orientation is illustrated in FIGS. 1—3 in which adjacent legs 32 form triangular patterns with base structure 16 or stylus supporting member 18. In the illustrated embodiment, pairs of first ends 36 are attached proximate one another to base structure 16 at three locations 46, as best illustrated in FIG. 2. Similarly, the second ends 38 are connected proximate one another to stylus supporting member 18 at three stylus supporting member locations 48, as best illustrated in FIG. 3. As also shown in FIG. 3, stylus supporting locations 38 are offset from base structure locations 46 by an angle 50, that would typically be approximately 60 degrees.

A sensor system 52, including a plurality of sensors 54, senses the movement of stylus supporting member 18 with respect to base structure 16. Ultimately, sensor system 52 tracks the movement of sensing tip 22 relative to a datum surface, such as the fixture or platform to which workpiece 24 is mounted. This is possible because the position of movable arm 14 (and thus base structure 16) is tracked relative to the datum by the coordinate positioning machine.

Preferably an individual sensor 54 is attached to each leg 32 to provide a signal indicative of the distance between its first end 36 and its second end 38. The combination of signals from the six sensors 54 can be used to mathematically calculate the exact position of sensing tip 22 relative to the desired datum surface in all six degrees of freedom, i.e., along all three linear axes x, y, z and all three rotational axes a, b, c. In other words, the position of sensing tip 22 relative to the desired datum surface is always known, and any movement of sensing tip 22 by, for instance, contact with workpiece 24, is sensed along all six axes. Therefore, the exact position at which sensing tip 22 first contacted workpiece 24 can be calculated, typically by a computer.

A variety of sensors 54 can be used to sense the sliding extension and retraction of each leg 32. For example, sensors 54 can include readheads and linear scales or LVDTs. For example, in one embodiment, each leg 32 is an LVDT 56, as illustrated. Alternatively, sensors could be connected to pivot mounts 40 to determine the angle and thus the position of each leg 32.

Stylus supporting member 18 is biased away from base structure 16 by a resilient member 60. In the illustrated embodiment, resilient member 60 comprises a piece of foam rubber disposed in contact with base structure 16 and stylus supporting member 18 between legs 32. However, numerous other resilient members, such as coil springs, can be used to bias apart the base structure 16 and the stylus supporting member 18.

Figure 4:
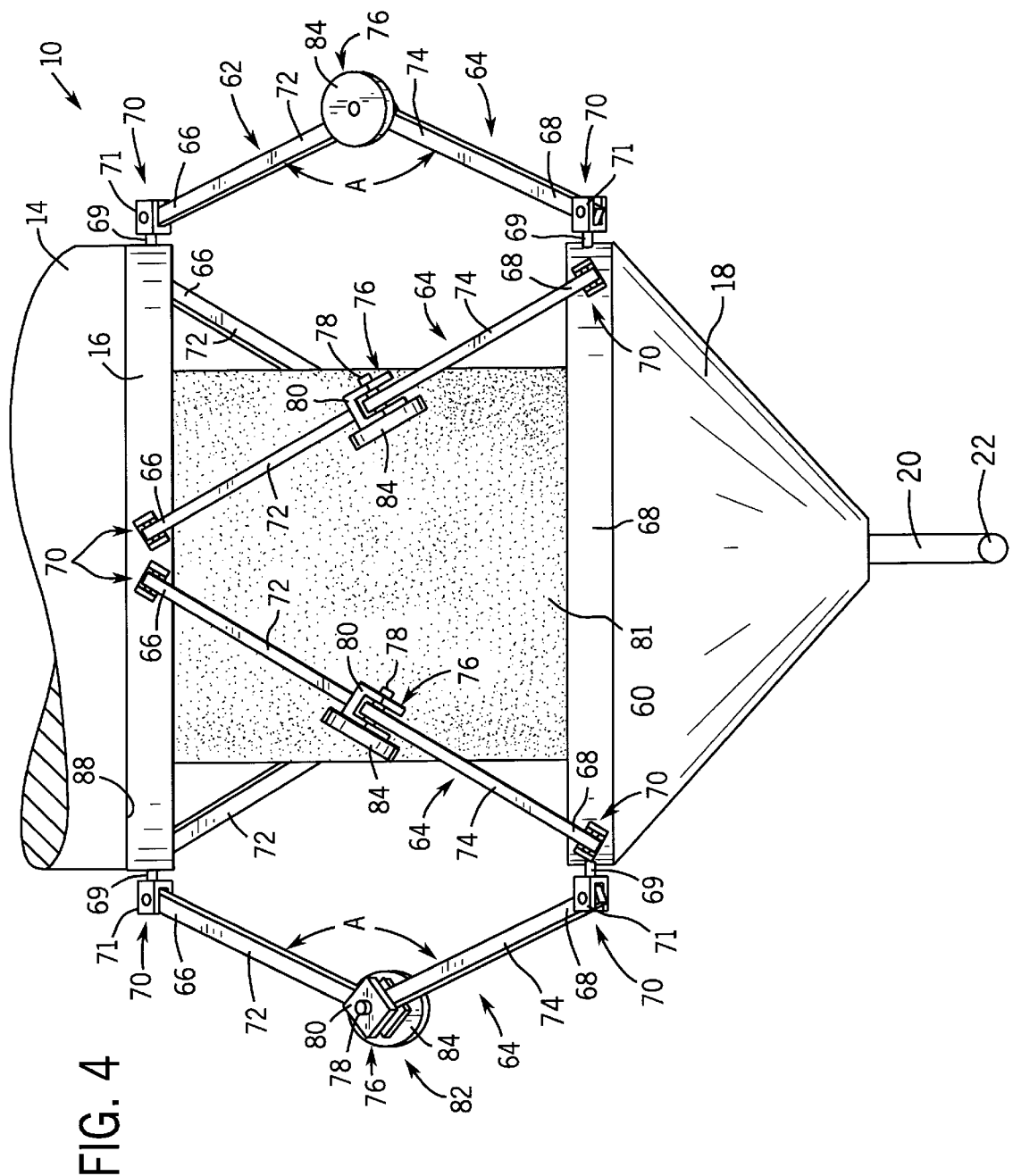
FIG. 4 is a front view of an alternate embodiment of the touch probe illustrated in FIG. 1.

In FIG. 4, another embodiment of touch probe 10 is illustrated with a different linkage assembly 62. Linkage assembly 62 includes a plurality, preferably six, legs 64 with each leg being hinged. Each leg 64 includes a first end 66 pivotably connected to base structure 16 and a second end 68 pivotably connected to stylus supporting member 18. The first end 66 and second end 68 of each leg 64 can be mounted to the base structure 16 and the stylus supporting member 18, respectively by a pivot member 70 having two degrees of freedom. For example, each pivot member 70 can include a shaft 69 rotatably mounted to a side of the base structure 16 or the stylus supporting member 18. A trunnion 71 is mounted to the shaft 69 for pivotably receiving an end of the corresponding leg 64.

First end 66 is part of a first link 72 of each leg 64. Similarly, second end 68 is part of a second link 74 of each leg 64. First links 72 are pivotably connected to corresponding second links 74 at hinge joints 76. In an exemplary embodiment of hinge joint 76, a pin 78 is affixed to second link 74 and rotatably mounted to a clevis 80 affixed to first link 72.

A sensor system 82 includes a plurality of sensors 84 that sense the movement of stylus supporting member 18 with respect to base structure 16. This permits calculation of the exact position of sensing tip 22 relative to a desired datum surface. As described above, this precise positional calculation is possible because sensing tip 22 of stylus 20 is fixed with respect to stylus supporting member 18 and the position of moveable arm 14 relative to the datum surface is known via the coordinate positioning machine.

In a preferred embodiment, sensors 84 comprise encoders attached to clevis 80 of each leg 64 for cooperation with pin 78. Thus, any changes in the angle A formed between the first link 72 and the second link 74 of each leg is sensed. The angles A formed by the six legs 64 can be used to calculate the position of stylus supporting member 18 with respect to base structure 16, and thus the position of sensing tip 22 relative to a desired datum. Alternatively, sensors could be applied to the pivot joints 70 to determine postion.

It will be understood that the foregoing description is of a preferred exemplary embodiment of this invention and that the invention is not limited to the specific forms shown. For example, a variety of sensors can be used to sense the position and movement of the sensing tip along up to six axes. Additionally, numerous types of permanent or replaceable styli can be used in many different orientations with respect to the stylus supporting member. Further, the resilient member may be a plurality of members disposed inside the legs, on the legs or external to the legs. These and other modifications may be made in the design and arrangement of the elements without departing from the scope of the invention as expressed in the appended claims.

What is claimed is:

1. A probe for use on a coordinate positioning machine having a movable arm, comprising:

a base structure by which the probe may be mounted to the movable arm;

a stylus supporting member;

a linkage assembly connected between the base structure and the stylus supporting member; and a plurality of sensors arranged to measure movement of the stylus supporting member relative to the base structure potentially along three linear axes and three rotational axes.

2. The probe as recited in claim 1, wherein the linkage assembly includes a plurality of legs, each leg being pivotably connected to the base structure and to the stylus supporting member.

3. The probe as recited in claim 2, further comprising a resilient member to bias the stylus supporting member away from the base structure.

4. The probe as recited in claim 2, wherein the plurality of legs includes six legs.

5. The probe as recited in claim 4, wherein the six legs include a pair of members that are slidably engaged.

6. The probe as recited in claim 4, wherein the six legs include a pair of members that are pivotably engaged.

7. The probe as recited in claim 4, wherein the plurality of sensors are mounted on the plurality of legs.

8. The probe as recited in claim 5, wherein the plurality of sensors includes a sensor attached to each of the legs.

9. The probe as recited in claim 8, wherein each sensor of the plurality of sensors includes a readhead and a linear scale.

10. The probe as recited in claim 6, wherein the plurality of sensors includes a sensor attached to each of the legs.

11. The probe as recited in claim 10, wherein each sensor of the plurality of sensors includes an encoder.

12. A probe for use on a coordinate positioning machine having a movable arm, comprising:

a base structure by which the probe may be mounted to the movable arm;

a stylus supporting member;

a plurality of legs, each leg having a first end pivotably connected to the base structure and a second end pivotably connected to the stylus support member, wherein the second end can be moved towards and away from the first end as the stylus support member is moved relative to the base structure; and a plurality of sensors arranged to measure movement of the stylus supporting member relative to the base structure along at least three axes.

13. The probe as recited in claim 12, further comprising a resilient member to bias the stylus supporting member away from the base structure.

14. The probe as recited in claim 13, wherein the plurality of legs includes six legs.

15. The probe as recited in claim 14, wherein the plurality of legs are telescoping legs.

16. The probe as recited in claim 14, wherein the plurality of legs are hinged legs.

17. The probe as recited in claim 14, wherein the resilient member comprises foam rubber.

18. A method for preparing a multi-axis probe for use on a coordinate positioning machine having a movable arm, comprising the steps of:

preparing a base structure that may be mounted to the movable arm;

preparing a stylus supporting member; and connecting the stylus supporting member to the base structure by a plurality of adjustable legs with each adjustable leg being pivotably connected to both the base structure and the stylus supporting member.

19. The method as recited in claim 18, further comprising the step of sensing the movement of the stylus supporting member relative to the base structure along up to six axes.

20. The method as recited in claim 19, wherein the step of connecting includes the step of providing each leg with a hinge joint to permit movement of the stylus supporting member relative to the base structure.

* * * * *